United States Patent
Fuchs (10) Patent No.: US 6,274,081 B1
(45) Date of Patent: Aug. 14, 2001

(54) SMELTING INSTALLATION WITH AN ELECTRIC-ARC FURNACE

(75) Inventor: Gerhard Fuchs, Kehl-Bodersweier (DE)

(73) Assignee: Arcmet Technologie GmbH, Linz (AT)

( * ) Notice: Subject to any disclaimer, the term of this patent is extended or adjusted under 35 U.S.C. 154(b) by 0 days.

(21) Appl. No.: 09/242,488

(22) PCT Filed: Oct. 20, 1999

(86) PCT No.: PCT/EP97/04581

§ 371 Date: Aug. 22, 1997

§ 102(e) Date: Aug. 22, 1997

(87) PCT Pub. No.: WO98/08041

PCT Pub. Date: Feb. 26, 1998

(30) Foreign Application Priority Data

Aug. 23, 1996 (DE) .............................................. 196 34 348

(51) Int. Cl.[7] ........................................................ F27D 3/00
(52) U.S. Cl. .................. 266/216; 266/900; 266/901; 373/79
(58) Field of Search ................................. 266/200, 236, 266/216, 900, 901; 373/79, 80, 81

(56) References Cited

U.S. PATENT DOCUMENTS

| | | | |
|---|---|---|---|
| 2,020,019 | 11/1935 | Collins et al. | 73/32 |
| 3,665,085 | * 5/1972 | Dumont-Fillon et al. | 373/80 |
| 3,747,408 | 7/1973 | Stanworth | 73/355 |
| 3,910,769 | 10/1975 | Mayer et al. | 23/284 |
| 4,160,663 | 7/1979 | Hsieh | 75/35 |
| 4,547,099 | 10/1985 | Alexandrov | 406/149 |
| 4,588,437 | 5/1986 | Kepplinger | 75/93 |
| 4,725,308 | 2/1988 | Kepplinger | 75/26 |
| 4,728,360 | 3/1988 | Hauk et al. | 75/26 |
| 4,755,219 | 7/1988 | Hauk | 75/10.22 |
| 4,793,855 | 12/1988 | Hauk | 75/26 |
| 4,852,858 | 8/1989 | Weber | 266/175 |
| 4,881,972 | 11/1989 | Weber et al. | 75/93 |
| 4,946,498 | 8/1990 | Weber | 75/26 |
| 4,995,904 | 2/1991 | Hauk | 75/445 |
| 5,153,894 | 10/1992 | Ehle et al. | 373/80 |
| 5,238,484 | * 8/1993 | Pirklbauer et al. | 266/900 |
| 5,451,246 | 9/1995 | Wells | 75/380 |
| 5,492,309 | 2/1996 | Meierling et al. | 266/156 |
| 5,645,791 | 7/1997 | Fuchs et al. | 266/175 |
| 5,999,556 | * 12/1999 | Hassig | 373/80 |

FOREIGN PATENT DOCUMENTS

| | | |
|---|---|---|
| 2 132 150 | 8/1972 | (DE) . |
| 2 403 780 | 2/1973 | (DE) . |
| 2 507 140 | 5/1974 | (DE) . |
| 3 421 878 | 9/1984 | (DE) . |
| 3 811 654 | 3/1986 | (DE) . |
| 3 735 966 | 9/1989 | (DE) . |
| 4 138 118 | 5/1993 | (DE) . |
| 3 928 415 | 3/1995 | (DE) . |
| 4 406 260 | 8/1995 | (DE) . |
| 4 424 324 | 1/1996 | (DE) . |
| 106 359 | 11/1985 | (EP) . |
| 192 912 | 6/1989 | (EP) . |
| 063 924 | 3/1990 | (EP) . |
| 385 434 | 5/1993 | (EP) . |
| 672 881 | 6/1998 | (EP) . |
| 709 688 | 7/1991 | (SU) . |
| 96/19592 | 11/1988 | (WO) . |
| 91/13305 | 9/1991 | (WO) . |

* cited by examiner

*Primary Examiner*—Scott Kastler
(74) *Attorney, Agent, or Firm*—Foley, Hoag & Eliot, LLP (57) ABSTRACT

This invention concerns a smelting installation with an electric-arc furnace in which the roof of the oven vessel is constructed out of two units (7, 8) which are separated by an aperture (38) and can be moved independently of one another relative to the vessel horizontally. One of these units (8) consists of a shaft (9) which serves as preheater for the charge. The upper part of the vessel and the shaft (9) have a converging wall sector (42*a*, 58, 59).

25 Claims, 9 Drawing Sheets

SMELTING INSTALLATION WITH AN ELECTRIC-ARC FURNACE

TECHNICAL FIELD

The invention concerns a smelting unit having an arc furnace.

STATE OF THE ART

A smelting unit of that kind is known from WO 90/10086. In the known smelting unit, an outer segment of the vessel cover is replaced by a shaft which is fixed to a holding structure and which, in its upper region, has a closable charging opening for the feed material, and a gas passage opening. The hot furnace gases are discharged through the shaft and, in heat-exchange relationship, heat charging material which is disposed in the shaft. That makes it possible to save a substantial amount of energy.

In order to be able to perform the smelting process without subsequent charging, it is advantageous if the entire amount of charging material for the weight of liquid metal, which is to be tapped off, fits into the total volume consisting of the furnace and the shaft. For that reason, and having regard to the further requirement of limiting the shaft height, the cross-section of the shaft is preferably rectangular and the furnace vessel in plan view is in the form of an oval which is defined on one side by a straight line. That makes it necessary to adopt a new shape of vessel, including the shape of the underneath vessel, in comparison with the wide-spread round shapes of vessel.

In the known smelting unit, the entire vessel cover is movable relative to the vessel either jointly or independently of the holding structure which carries the shaft. Releasable fixing of the vessel cover to the holding structure has proven to be advantageous so that the vessel cover, including the shaft, is pivotable or linearly displaceable relative to the furnace vessel. In the last-mentioned construction, it is possible to provide for specific targeted charging of feed material into different regions of the furnace vessel, through the shaft.

In the case of the known smelting unit, there is also the possibility of charging material being retained in the space in the shaft by means of retaining members which are provided in the lower region of the shaft so that, after smelting of a charge, during the refining phase, the hot waste gases can be utilised for preheating feed material.

Retaining members of that kind are described in detail in WO 95/04910. Reference is expressly directed thereto in the present application.

The present invention aims at using the tried-and-tested technology in already existing installations. Existing arc furnaces are to be converted at a minimum level of cost in such a way that as many components as possible of the existing installation can still be used and also the building in which the smelting unit is disposed does not have to be substantially altered. In this respect there is the particular problem that, in the case of the conventional arc furnaces with a round or also oval furnace vessel, in which the electrodes are arranged at the centre of the vessel cover, the space requirements for a shaft which is used as a charging material preheater and which is to be arranged beside the electrodes as an outer segment of the vessel cover, in particular having regard to the height of the building, are so restricted that it is not possible to provide sufficient volume in the shaft for the charging material which is to be heated. The furnace vessel may consist of one part or it may be divided above the slag line into an underneath vessel (lower vessel portion) and a top vessel (upper vessel portion). The furnace cover is generally of an arched configuration and has in a concentric arrangement three passage means (three-phase furnace) or centrally one passage means (dc furnace) for the electrode(s), which are referred to as the electrode opening or openings.

STATEMENT OF THE INVENTION

The object of the present invention is to design a smelting unit that as many components as possible of existing arc furnaces can be used, that is to say the minimum number of components have to be replaced or modified.

In the case of an arc furnace with a round or oval lower vessel portion, in which the electrodes are disposed concentrically in the region of the centre, the invention seeks to provide that, with the conditions in respect of space being limited by the electrode arrangement and the height of the building, there is a volume in the shaft for the charging material which is to be heated, that is sufficient to be able to perform the smelting process as far as possible without a post-charging operation.

Retaining members provided in the shaft, for retaining the charging material, are to be adapted to the particular factors involved.

The invention further seeks to ensure that the solution according to the invention can prevent furnace gases from issuing in the region of the cover.

In order to provide an adequate volume for the charging material which is to be preheated, in the shaft which is arranged laterally beside the electrodes on the vessel cover, the shaft cross-section selected is so great that in plan view the internal contour of the shaft wall which is the rear shaft wall as viewed from the electrode openings, of at least the upper shaft portion, lies outside the internal contour of the upper edge of the lower vessel portion. Preferably the cross-sectional profile of the shaft in that portion is of a rectangular configuration or is of a configuration that follows a trapezoidal line. The configuration according to the invention of the sector of the upper vessel portion in the region below the shaft, namely the design configuration of the upper vessel portion with a wall sector which converges from its upper edge to its lower edge, makes a transition from the shaft walls which lie outside the internal contour of the lower vessel portion to the internal contour of the upper edge of the lower vessel portion, that is to say the furnace hearth, which guides the charging material from the outer regions of the shaft unimpededly into the lower vessel portion. The transition from a shaft shape which is of rectangular profile into a round or oval furnace vessel can occur in various ways, for example by way of rectangular-oval-round or rectangular-polygonal-round cross-sections. The converging wall sector, like also the other sectors of the upper vessel portion, is usually formed by water-cooled wallpanels which, when feed material is charged through the shaft, feed it to the lower vessel portion (furnace hearth) which is of round or oval cross-section.

The transition from the internal contour of the shaft walls, which in plan view lies outside the internal contour of the upper edge of the lower vessel portion, to -the upper edge of the round or oval lower vessel portion, can already be started above the upper edge of the upper vessel portion, that is to say above the edge of the vessel, insofar as here the shaft walls which are remote from the electrode openings are guided inclinedly inwardly towards the vessel centre (centre line of the vessel) or the upper edge of the upper vessel portion. Such a configuration can be afforded in the lower shaft portion either by means of a converging oval-shaped wall portion or by means of flat elements which make the transition for the shaft wall that is remote from the electrodes, from a profile that is linear in a horizontal section into a polygonal profile, preferably a profile which follows a trapezoidal line. Preferably the lower edge of the shaft walls which are remote from the electrodes is of approximately the same internal contour as the internal contour of the upper edge of the vessel. That contour then also corresponds to the contour of the second cover portion on which the shaft is arranged.

In the smelting unit according to the invention, the entire furnace substructure including the lower vessel portion and the electrode lifting and pivoting arrangement, can continue to be used, in a conversion situation.

If the converging transition from a rectangular cross-section to the round vessel cross-section already begins in an upper shaft portion, for example just beneath the upper shaft opening, then, as viewed from the electrodes, the front shaft wall must be arranged to extend parallel to the rear shaft wall so that the internal cross-section of the shaft does not decrease in a downward direction.

If therefore the linear cross-sectional profile of the rear shaft wall of a shaft which is rectangular in the upper shaft portion is converted into a polygonal profile, preferably a profile following a trapezoidal line, then, in parallel therewith, that is also necessary for the front shaft wall, in other words, the linear profile of the front shaft wall is to be converted into the polygonal profile in question, in a configuration that converges towards the centre of the vessel, in the same manner. The cross-sectional profile in the lower shaft portion is then formed by two parallel polygonal or trapezoidal lines which are connected by the profiles of the side walls. If in the lower shaft portion the rear shaft wall and the adjoining lateral shaft walls are formed by a wall sector which converges towards the upper edge of a round or oval vessel, then in a conversion operation it is even possible to continue to use the existing round or oval upper vessel portion. That solution is of particular significance in relation to an arc furnace with an arched cover and a shaft with retaining members.

In accordance with a further aspect of the present invention the first cover portion which has the electrode opening and the second cover portion which has the shaft are in the form of units which are separated from each other by a cover gap and which are displaceable horizontally relative to the vessel independently of each other. In this case parts of the old cover can also still be used in a conversion situation.

The cover gap which occurs by virtue of separation into two mutually independent units which are pivotable or displaceable horizontally relative to the vessel can be sealed off if necessary in a simple fashion so that there is no risk of environmental pollution by virtue of furnace gas escaping, in comparison with a cover consisting of one unit.

Account is taken of that transitional zone from a rectangular contour into a round contour, by virtue of a particular configuration and arrangement of the retaining members.

BRIEF DESCRIPTION OF THE DRAWINGS

The invention is described in greater detail by means of four embodiments with reference to ten Figures of diagrammatic drawings in which:

FIG. 4 shows the section IV—IV in FIG. 3 with the vessel cover closed, that is to say with the first cover portion pivoted in, including the electrodes, and the second cover portion moved in.

WAY OF CARRYING THE INVENTION INTO EFFECT

Figure 1:
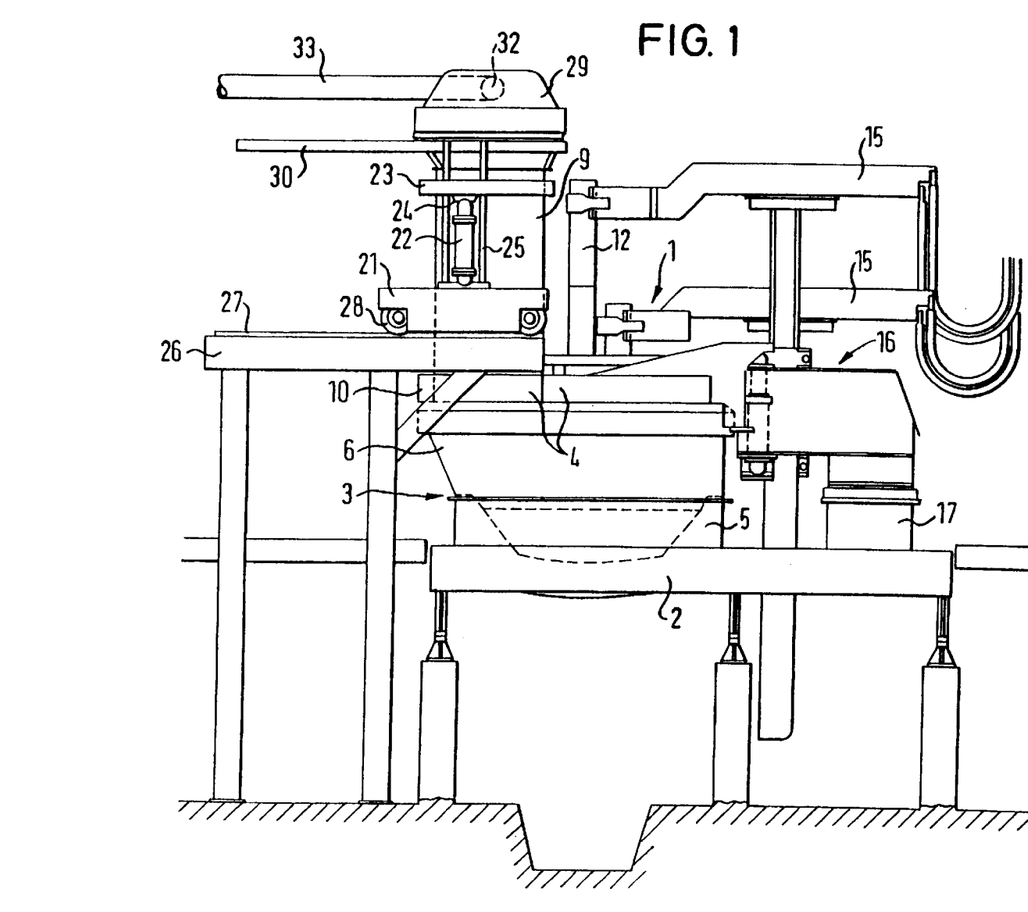
FIG. 1 is a side view of a smelting unit according to the invention with the vessel cover closed.
Figure 2:
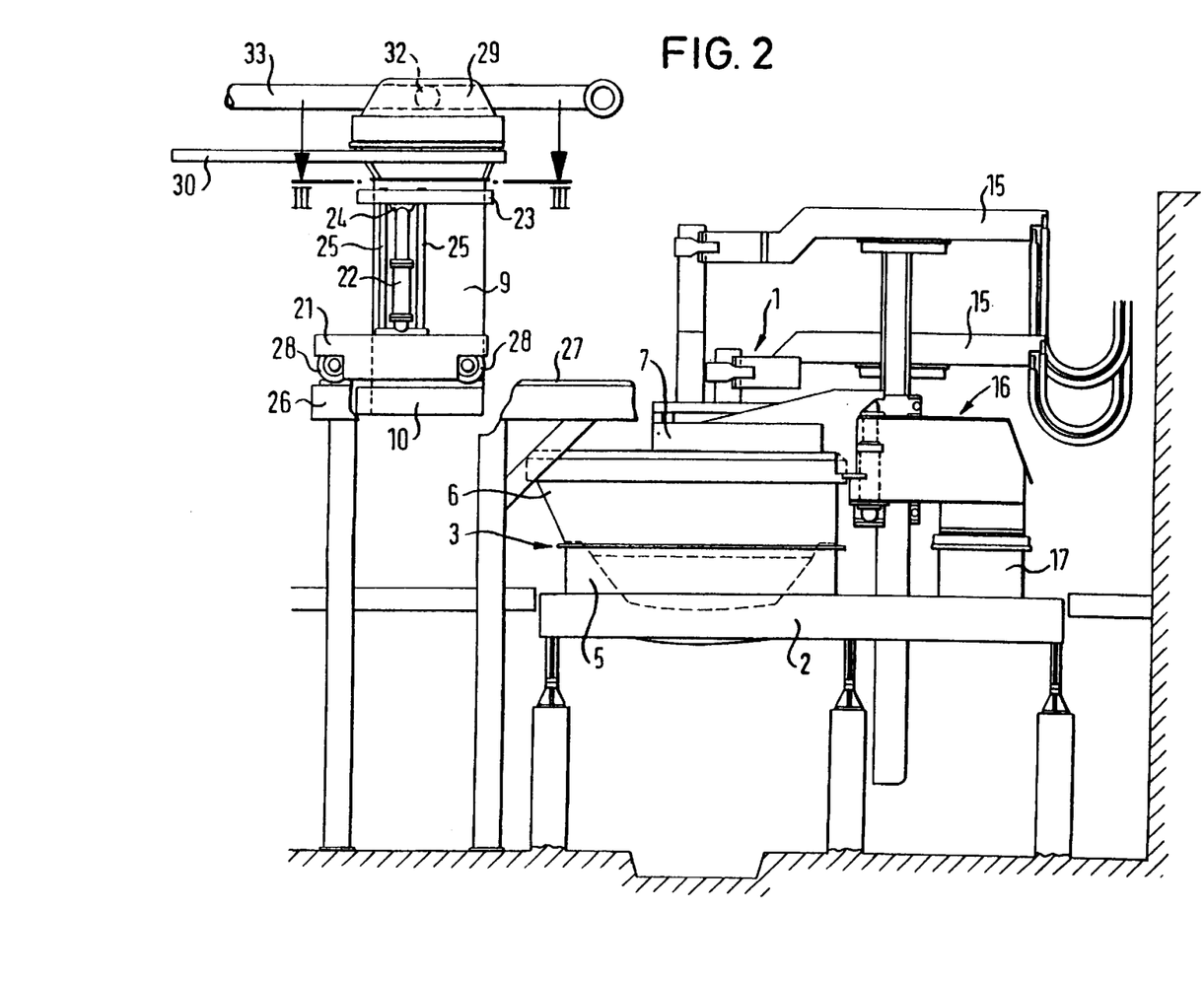
FIG. 2 shows the unit of FIG. 1 with the second cover portion including the shaft removed.

The smelting unit illustrated in FIGS. 1 to 5 as the first embodiment includes an arc furnace 1 comprising a furnace vessel 3 mounted on a furnace cradle 2, and a vessel cover 4 of an arch-like shape covering the upper edge of the furnace vessel 3. The furnace vessel 3 comprises a lower vessel portion 5 forming the brick-lined furnace hearth, for receiving the molten metal, and an upper vessel portion 6 which is usually formed from water-cooled elements. As can be seen in particular from FIGS. 3 to 5, the vessel cover 4 comprises a first cover portion 7 which is shown in the outwardly pivoted position in FIG. 3, and a second cover portion 8 which is substantially formed by the lower end portion of a shaft 9 or a frame 10 accommodating the lower portion of the shaft 9 (FIGS. 1 and 2). In FIG. 1 the two-part vessel cover is closed, in FIG. 2 the second cover portion including the shaft 9 is extended.

Figure 3:
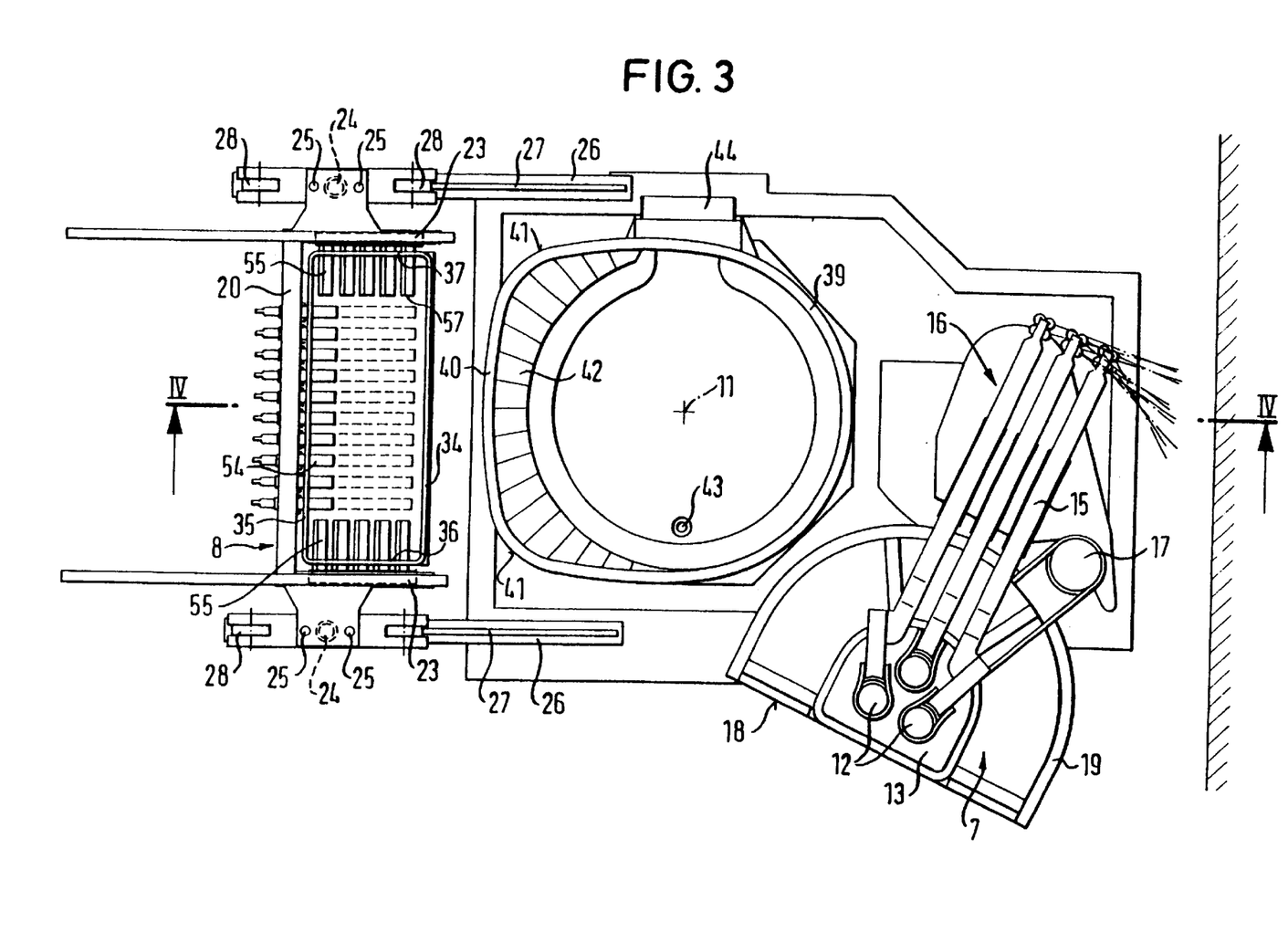
FIG. 3 is a plan view of the smelting unit with the section III—III of the shaft, as shown in FIG. 2, and with the first cover portion pivoted away, with a transitional shape of oval form from a rectangular cross-section of the shaft into a round lower vessel portion.
Figure 4:
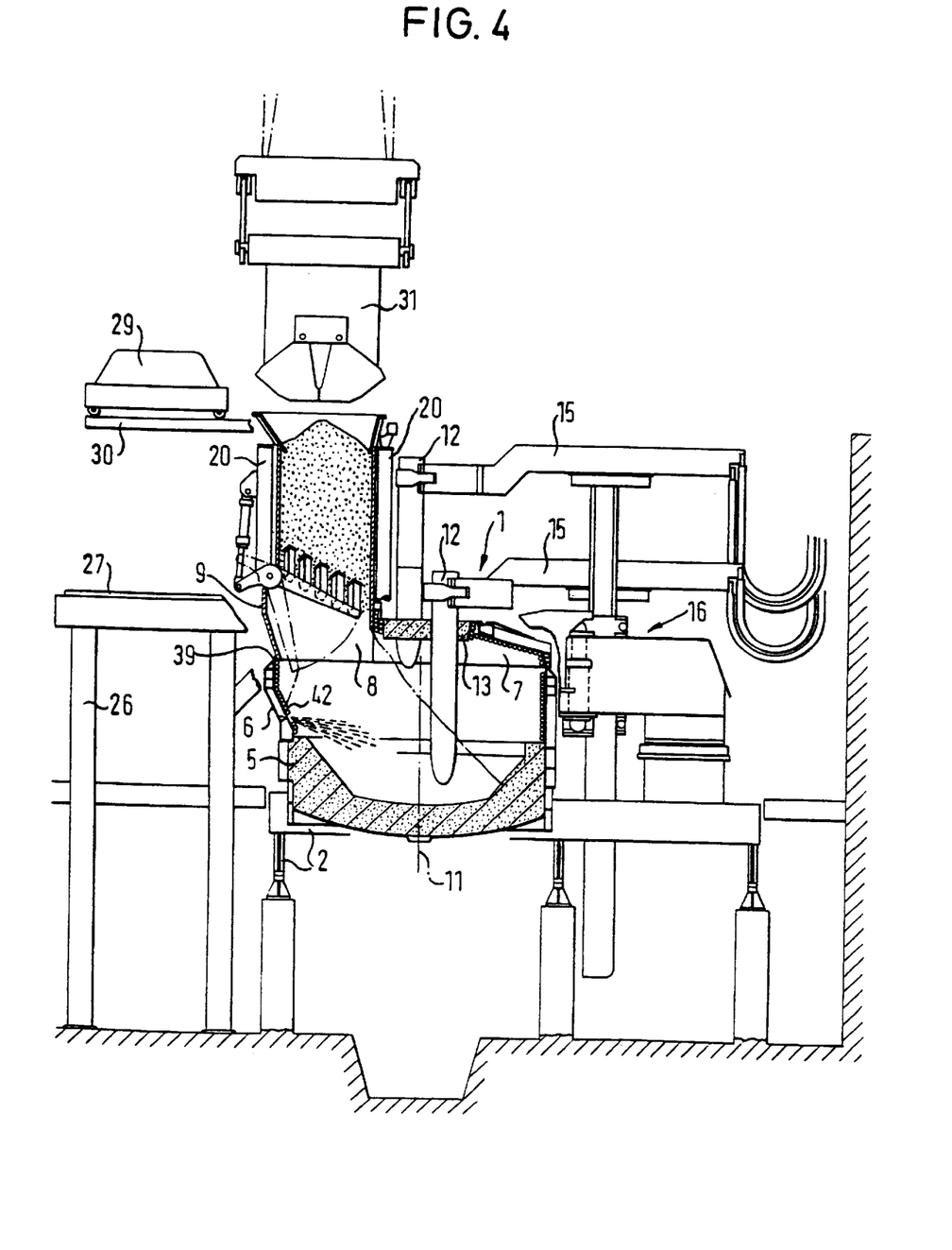
Figure 5:
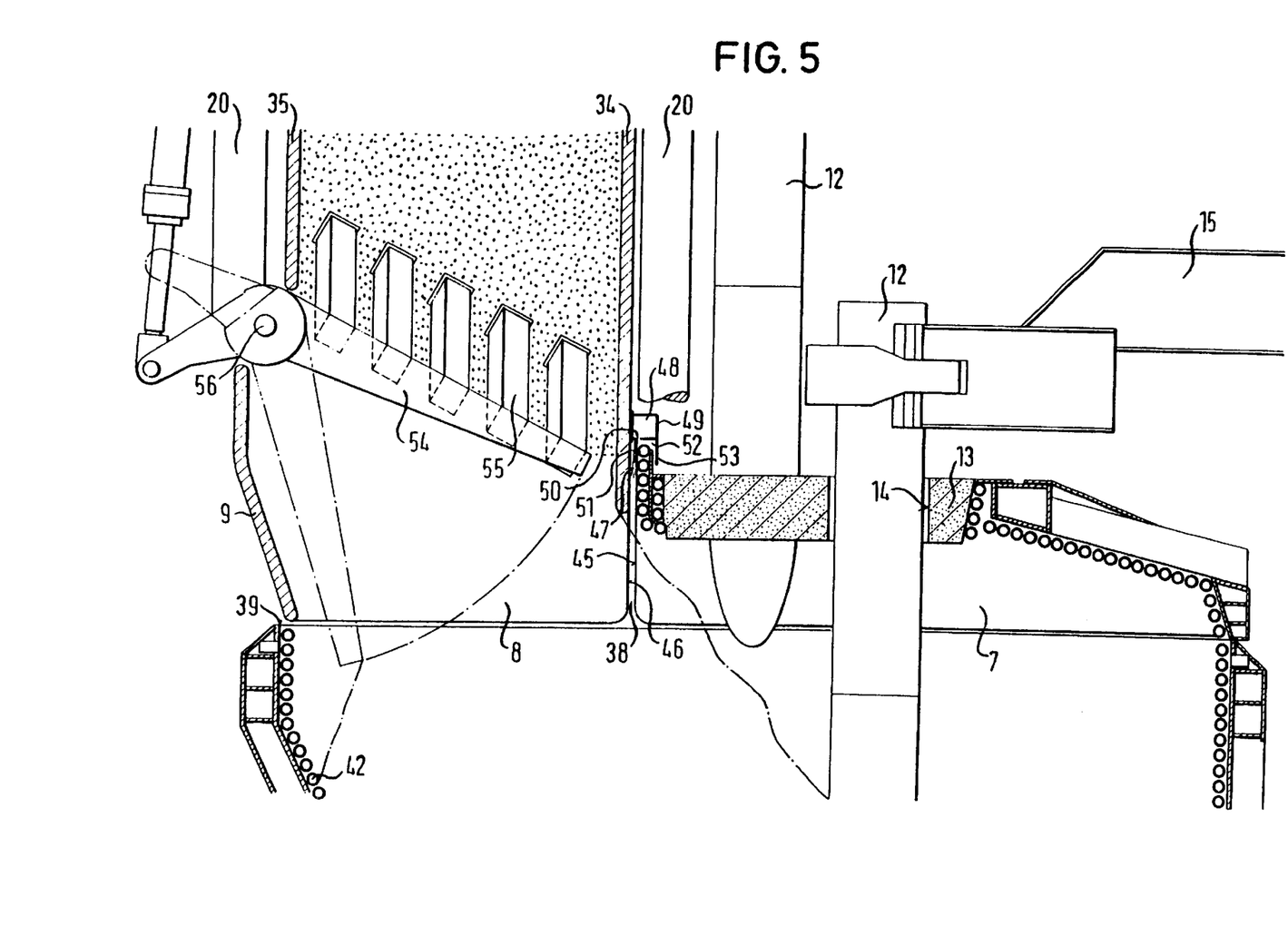
FIG. 5 shows a part on an enlarged scale of the view shown in FIG. 4.

As shown in particular by FIGS. 3 to 5, the part shown in the drawings to the right of the centre of the furnace vessel corresponds to a conventional arc furnace with a round furnace vessel and electrodes 12 which can be moved into the furnace vessel concentrically to the vessel centre 11 (central axis of the vessel, see FIGS. 3 and 4). Only the region illustrated in the drawings to the left of the electrodes 12 is modified above the lower vessel portion in comparison with the usual configuration of an arc furnace with a round vessel shape.

The first cover portion 7 is of an arch-like configuration and has a so-called cover heart or core portion 13 with electrode openings 14 (FIG. 5) for three arc electrodes 12 which are to be introduced into the vessel, in the usual triangular arrangement of a three-phase arc furnace. The electrodes 12 are mounted to electrode carrier arms 15 and can be raised/lowered and pivoted to the side by means of an electrode lifting and pivoting arrangement 16. The first cover portion 7 can be lifted by means of a cover lifting and pivoting arrangement 17 and can be lifted from the position shown in FIGS. 4 and 5 in which it lies on the edge of the vessel and can be pivoted to the side into the position shown in FIG. 3 in order to open the furnace vessel for example for basket charging from above. A suitable cover lifting and pivoting arrangement is described for example in EP-0 203 339.

In the illustrated embodiment not only the furnace vessel 3 but also the cover lifting and pivoting arrangement 17 and the electrode lifting and pivoting arrangement 16 are fitted on to the furnace cradle 2 so that the furnace vessel can be tilted, jointly with the electrodes.

So that the electrode arrangement does not have to be modified in a conversion operation, the construction in accordance with the first embodiment provides that the first cover portion is in the form of an oval 19 which is defined by a chord 18 and which includes the usual electrode configuration. When the first cover portion is fitted on to the furnace vessel, the chord 18 must lie in the tilting direction, that is to say perpendicularly to the plane of the paper in the view shown in FIG. 2. In that way the furnace vessel can be tilted for the tapping-off operation or the slag removal operation, with the cover portion 7 closed and without displacement of the cover portion 8. In that situation the shaft 9 only has to be slightly lifted. In that way the heat losses due to radiation are reduced or the hot furnace gases pass for the major part into the preheating shaft. Possibly the gap which occurs when the shaft 9 is raised between the lower edge of the shaft or the second cover portion 8 and the vessel edge (39 in FIG. 5) can be sealed off by means of an apron or other means which are mounted to the shaft or to the vessel edge.

The shaft 9 is fixed in a frame structure 20 which can enclose the shaft 9 in the manner of a cage, the frame 10 illustrated in FIGS. 1 and 2 of the second cover portion 8 representing a part of the frame structure. The frame structure 20 which is only diagrammatically illustrated in the Figures carrying the shaft 9 is mounted in a holding arrangement 21 in such a way that the frame structure 20 can be raised and lowered jointly with the shaft by means of a lifting device 22. For that purpose, provided on transverse beam members 23 of the frame structure are engagement locations 24 for the lift devices 22 which are supported on the holding arrangement 21, so that the transverse beam member 23 and therewith the frame structure 20 carrying the shaft can be lifted out of the lower position shown in FIG. 1 into the upper position shown in FIG. 2. In that situation, the required guidance effect is afforded by guide bars 25.

The holding arrangement 21 with shaft 9 is horizontally displaceable. For that purpose, rails 27 are provided on a support structure 26 and the holding arrangement 21 is provided with wheels 28 which permit displacement of the holding arrangement 21 in the horizontal direction.

The shaft 9 is closed at the top by means of a shaft cover 29 which, in the illustrated embodiment, is displaceable horizontally on rails 30 in order to open the upper shaft opening for charging by means of a crane 31 (FIG. 4). On the side which is the rear side in FIG. 1, the shaft cover 29 which is of a cap-like or dome-like configuration has a gas passage opening 32 connected to a waste gas conduit 33 when the shaft 9 and therewith the frame 10 are in the position shown in FIG. 1.

FIG. 3 shows that the shaft 9 is of rectangular cross-sectional configuration. Preferably the shaft is rectangular in the lower region of the shaft when the assembly has retaining members for retaining the feed material, as are described in greater detail hereinafter. Therefore the shaft 9 has shaft walls which are arranged in a rectangular shape at least in its lower region, with a front shaft wall 34 which is adjacent to the chord 18 of the first cover portion 7 when the vessel cover is closed (FIG. 1, FIG. 4 and FIG. 5), a rear shaft wall 35 which is remote from the chord 18, and two lateral shaft walls 36 and 37 connecting those walls. In that arrangement, the front shaft wall 34 is of approximately the same length as the chord 18, that is to say the shaft wall 34 adjoins the chord 18, with a narrow cover gap 38. The cover gap is shown on an enlarged scale in FIG. 5.

It should be noted at this point that, in the case of a dome-like vessel cover, as is shown in FIGS. 4 and 5, the chord is only a straight line in plane view but otherwise a line following the section of the dome profile, and thus also the lower edge of the front shaft wall 34 is of the same shape.

When the vessel cover is closed, that is to say in the condition shown in FIGS. 1, 4 and 5, the external contour of the vessel cover is formed from the lower edge of the rear shaft wall 35, the lower edge of the two adjoining lateral shaft walls 36 and 37, and the oval part 19, adjoining same, of the first cover portion 7. The upper vessel edge 39, that is to say the upper edge of the upper vessel portion 6, is adapted to that contour. The contour of the upper edge 39 of the vessel thus corresponds in this embodiment to an oval defined by a straight line or a shallow arc 40, with rounded corners 41.

The transition from the sector of the edge of the vessel defined by the straight line 40 and the adjoining portions of the oval, to the respective sector of the round cross-section of the lower vessel portion, is made by a converging wall sector 42 of the upper vessel portion 6 (see FIG. 3).

As already mentioned and shown in FIG. 5 the first cover portion 7 is separated from the second cover portion 8 by a gap 38 which extends parallel to the chord 18 so that the furnace vessel can be tilted in the direction which is determined by the furnace cradle and in which there are arranged a tapping hole 43 and a working opening 44, as viewed from the centre 11 of the vessel, without that being impeded by the adjoining front wall 34 of the shaft 9. As the second cover portion 8 and therewith the shaft 9 is fixed in a holding arrangement carried by the support structure 26, that is to say not on the furnace cradle, that part of the cover cannot also perform the tilting movement. It is sufficient however for the lower edge of the shaft to be slightly lifted away from the upper edge 39 of the vessel in order to permit slight tilting movements of the furnace vessel with the second cover portion lying thereon and with the electrodes retracted.

In order to prevent furnace gases from escaping through the gap 38 between the two cover portions, in accordance with a development of the invention means for sealing off the cover gap 38 are provided at at least one of the mutually adjoining edges 45 and 46 respectively of the first and second cover portions. Such sealing means are described hereinafter.

One of those means provides that a sealing gas 47 is blown into the gap 38. For that purpose, provided along the edge 46, that is to say at the front shaft wall 34, is a duct 48 with a slit-shaped nozzle opening which is towards the cover gap 38, or a row of holes. In the illustrated embodiment the duct is formed by a hollow shaped bar portion 49 which is secured to the front shaft wall 34. The nozzle opening is disposed at the underside of the hollow shaped bar portion and is identified by reference numeral 50.

A further means which can be additionally used is that provided at the edge 45 of the first cover portion is a strip arrangement 51 which is formed by cooling tubes and which, when the cover is closed, engages with clearance into a groove 52. In the present case the groove 52 is formed by the underside of the hollow shaped bar portion 49 in conjunction with an angled sealing strip member 53 arranged on the hollow shaped bar portion 49.

Preferably, the shaft 9 is provided with retaining members 54 (fingers) for the charging material. The retaining members described in WO 95/04910 are particularly suitable for that purpose.

Depending on the respective contour of the upper vessel edge 39, 40, 41 and the configuration of the converging wall sector 42 however those retaining members 54 need to be of a special configuration and arrangement.

In the first embodiment with a transition from a rectangular cross-section of the shaft by way of an oval into the round of the lower vessel portion, the converging wall sector 42 of the upper vessel portion means that there are further requirements involved in regard to guidance of the charging material upon pivotal movement of the fingers into the release position. The angle of rotary movement of the outer fingers is limited.

As adaptation to the shape of the wall sector 42 of the upper vessel portion 6, the arrangement, besides the pivotable fingers 54, also has fixed fingers 55 serving as deflectors.

The pivotable fingers 54 are arranged parallel and at a spacing from each other (see FIG. 3) and are mounted in rotary mountings 56 arranged in the frame structure 20 at the rear shaft wall 35. The pivotable fingers 54 are pivotable downwardly from the closed position which is shown in solid lines in FIG. 5 and in which the inner portions of the fingers project into the internal space of the shaft and prevent charging material from passing therethrough, into a release position which is shown in dash-dotted line in FIG. 5 and in which the inner portions of the fingers point downwardly and permit the charging material to pass through the shaft. The pivotable fingers 54 are also inclined downwardly at an angle of about 20° relative to the horizontal, in the closed position.

The further fingers 55 which are in the form of fixed fingers are resiliently mounted in the frame structure adjacent to the lateral shaft walls 36 and 37 and project through the lateral shaft walls 36 and 37 into the interior of the shaft, with those fingers also being arranged at a spacing from each other. The ends 57 of the fixed fingers are adjacent to the two outer pivotable fingers 54 when the latter are in the closed position (solid line in FIG. 5). In that way, formed in the lower region of the shaft is a retaining member for the charging material, which extends over the entire shaft cross-section and which permits the hot furnace gases to pass into the column of charging material retained in the shaft, so as to heat the column of charging material. When the pivotable fingers 54 are jointly pivoted downwardly from the closed position shown in solid line in FIG. 5 into the open position illustrated by dash-dotted line, the downwardly falling material is guided both by the pivotable fingers 54 and also by the fixed fingers 55 towards the centre, that is to say into the round lower vessel portion, so that the wall sector 42 of the upper vessel portion is protected from an excessively great loading.

Figure 6:
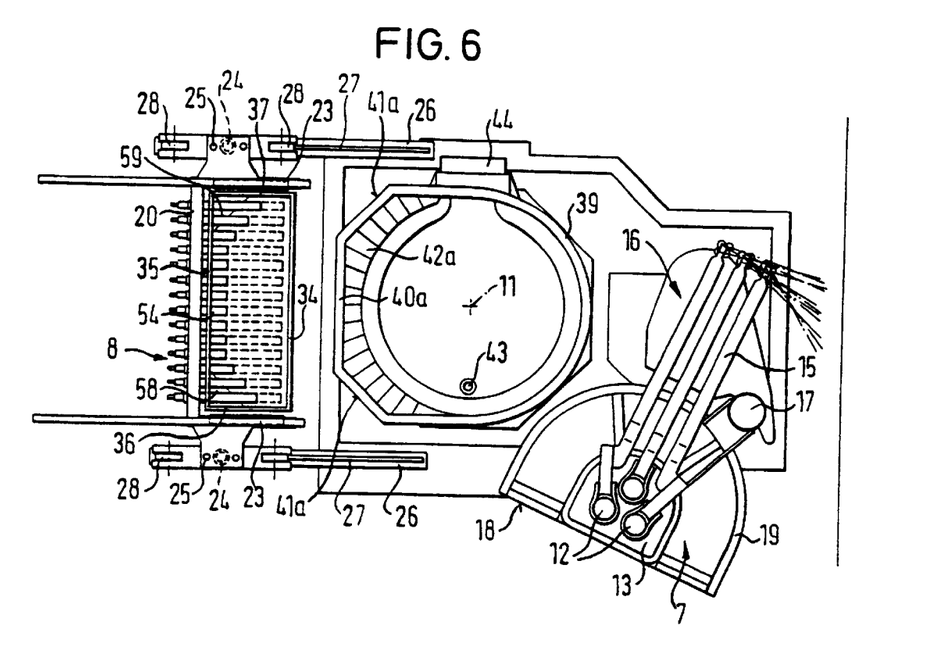
FIG. 6 is a view corresponding to FIG. 3 of a second embodiment in which the transition from the rectangular cross-section of the shaft into a round furnace vessel begins in the lower shaft portion beneath the retaining members and is of a polygonal configuration.

In the second embodiment illustrated in FIG. 6 the transition from a rectangular cross-section of the shaft 9 to the round cross-section of the lower vessel portion 5 is formed by way of a polygonal cross-section which in this example follows a trapezoidal line. In addition the transition is already commenced above the upper edge 39 of the upper vessel portion insofar as, in the lower shaft portion beneath the retaining members 54, the corners between the shaft walls 35 and 36, and 35 and 37, are of a configuration such as to converge towards the centre of the vessel. The converging shaft wall sectors are identified by references 58 and 59. They are flat surfaces which convert the rectangular cross-section into a cross-sectional profile of the walls 36, 35 and 37, which profile follows a trapezoidal line and which is then reflected in the profile of the upper edge 39 of the vessel by straight portions 40a and 41a. The further transition from the contour of the upper edge 39 of the upper vessel portion, which follows a trapezoidal line in the region beneath the shaft 9, to the round cross-section of the lower vessel portion, is by means of a converging wall sector 42a.

With the transitional shape shown in FIG. 6, it is possible to omit the fixed fingers 55 of the first embodiment, which serve as deflectors. The fingers 54 which are disposed above the shaft wall sectors 58 and 59 however cannot be pivoted downwardly as far as the central fingers. In FIG. 6 the release position of the fingers 54 is illustrated in solid lines and the closed position in broken lines. It will be seen that in the example in question, three fingers which are respectively adjacent to each of the shaft walls 36 and 37 and for which the maximum open position is illustrated cannot be pivoted downwardly as far as the central fingers. That presupposes individual actuation of the pivotal movement of those fingers while the central fingers can be pivoted jointly.

In the second embodiment the transition from the rectangular cross-section to the round cross-section is already begun in the lower shaft portion beneath the retaining members, while the wall 34 adjacent to the electrode openings is not changed in comparison with the first embodiment. Nonetheless the through-passage cross-section of the shaft in the lower shaft region does not experience at least any noticeable reduction if the vessel cover is of an arch-like configuration and the lower edge of the shaft wall 34 follows the arch contour.

Figure 7:
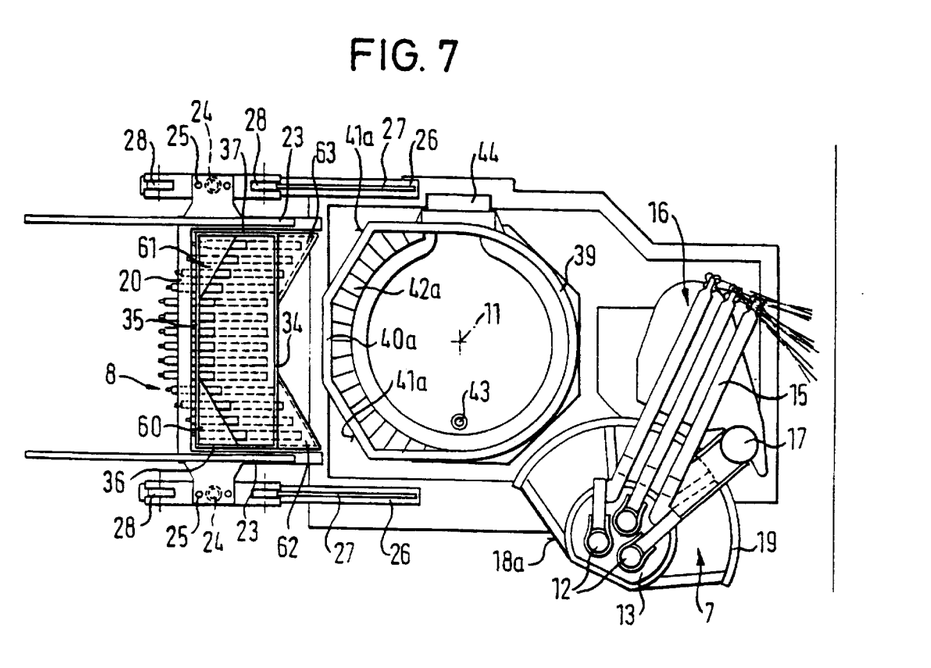
FIG. 7 is a view corresponding to FIG. 6 of a third embodiment in which the transition from the rectangular cross-section of the shaft into a round furnace vessel already begins in an upper shaft portion above the retaining members.
Figure 8:
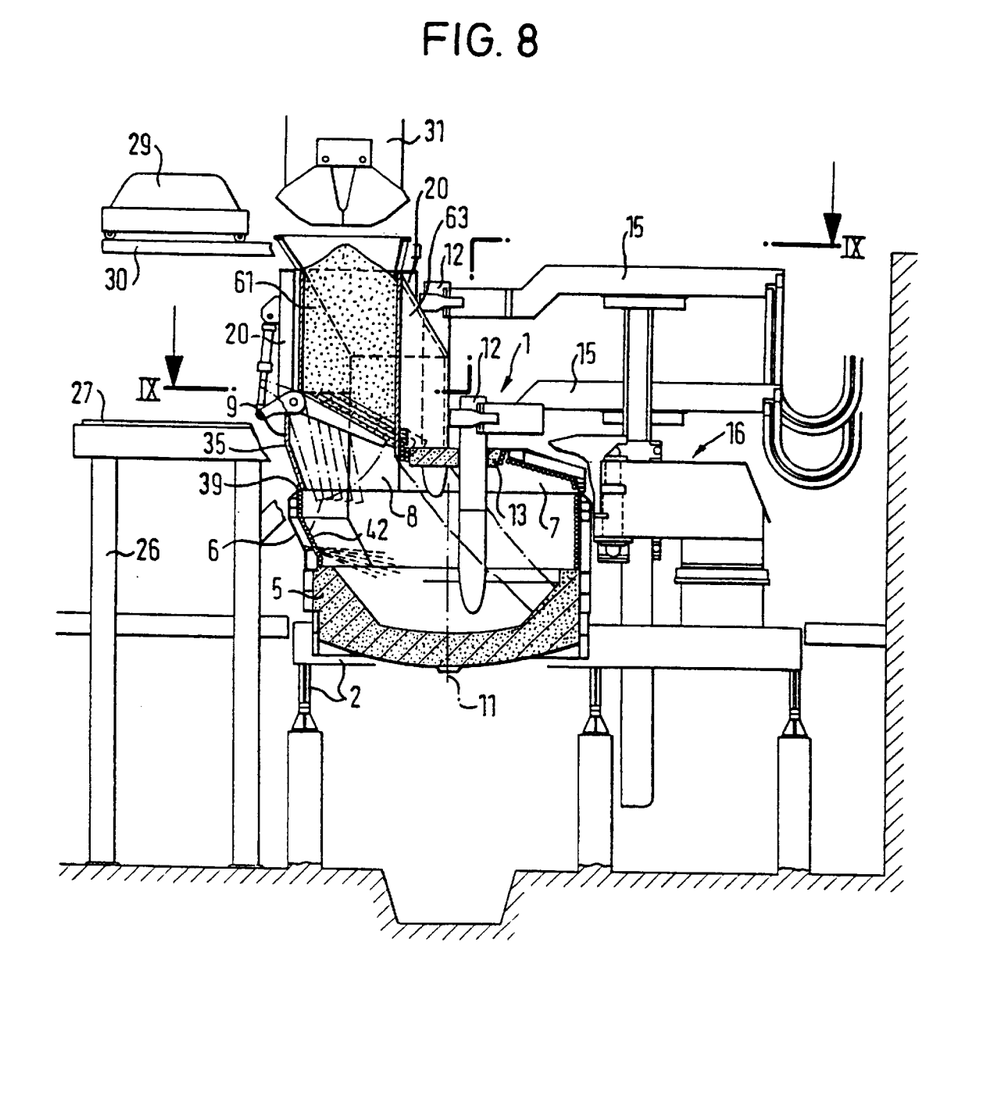
FIG. 8 is a view of this embodiment, corresponding to FIG. 4.
Figure 9:
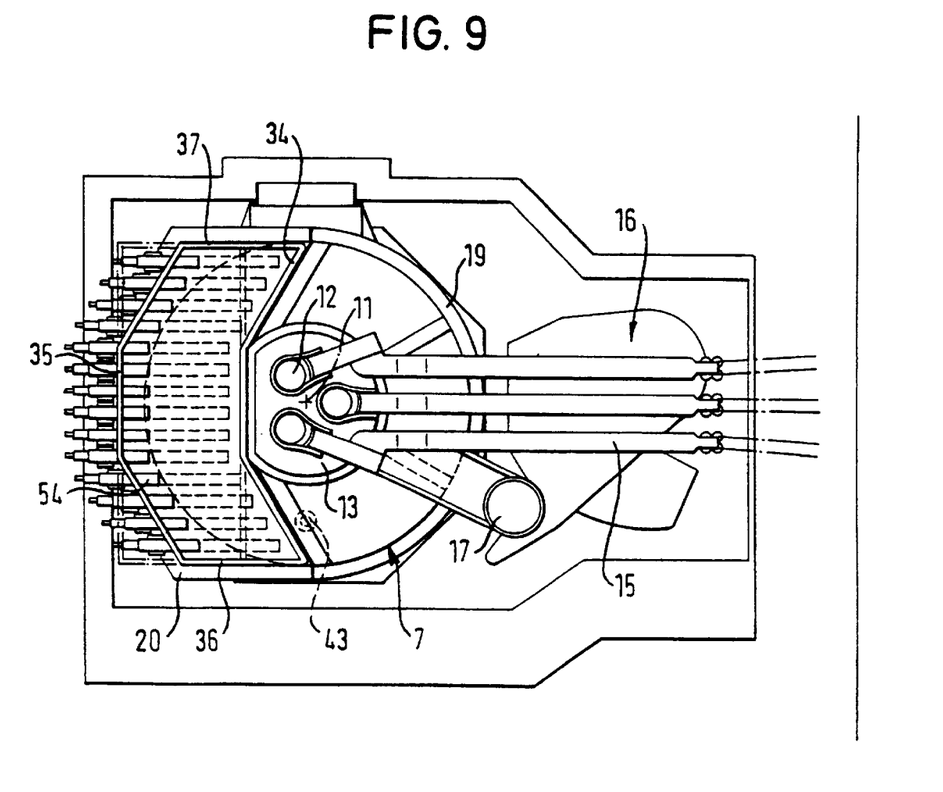
FIG. 9 shows the substantial part of the section IX—IX in FIG. 8.

In the embodiment illustrated in FIGS. 7 to 9 the transition from a rectangular cross-section to the round cross-section already occurs in an upper shaft portion—as FIG. 8 shows, immediately beneath the upper shaft opening—while in this case also, as in the second embodiment, the shaft wall 35 which is the rear wall as viewed from the electrodes is converted into a contour following a trapezoidal line. So that the shaft cross-section is not reduced in a downward direction—it should rather increase in size in order to permit unimpeded emptying—the third embodiment also provides that the shaft wall 34 which is the front wall as viewed from the electrode openings is of such a configuration as to converge towards the centre of the vessel, more specifically parallel to the rear shaft wall 35. The converging portions of the rear shaft wall are denoted by references 60 and 61 and those of the front shaft wall are denoted by references 62 and 63.

As in this embodiment the transition is already begun above the fingers 54, the fingers are arranged in a plane in which the contour both of the rear shaft wall 35 and also the front shaft wall 34 follows a trapezoidal line. To match that cross-section, the horizontal frame member of the frame structure 20, which adjoins the rear shaft wall 35 and in which the rotary mountings 56 of the pivotal fingers 54 are disposed, is also arranged parallel to the trapezoidal line contour of the rear shaft wall 35. In comparison with the second embodiment, all fingers can be opened equally far, as in the first embodiment. The release position of the fingers 54 is shown in FIGS. 7 and 9 in solid lines while the closed position is respectively illustrated in broken lines.

As, to avoid a constriction in the through-passage cross-section, the front shaft wall is also of a downwardly convergent configuration so that in plan view the contour of the lower edge of the shaft wall 34 follows a trapezoidal line, the adjoining edge (chord 18*a*) of the first cover portion 7 involves the same contour. In that way, with the two cover portions 7 and 8 in the inwardly pivoted and retracted position as shown in FIG. 9, the gap between those two cover portions is as narrow over its entire length, as in the earlier embodiments.

Figure 10:
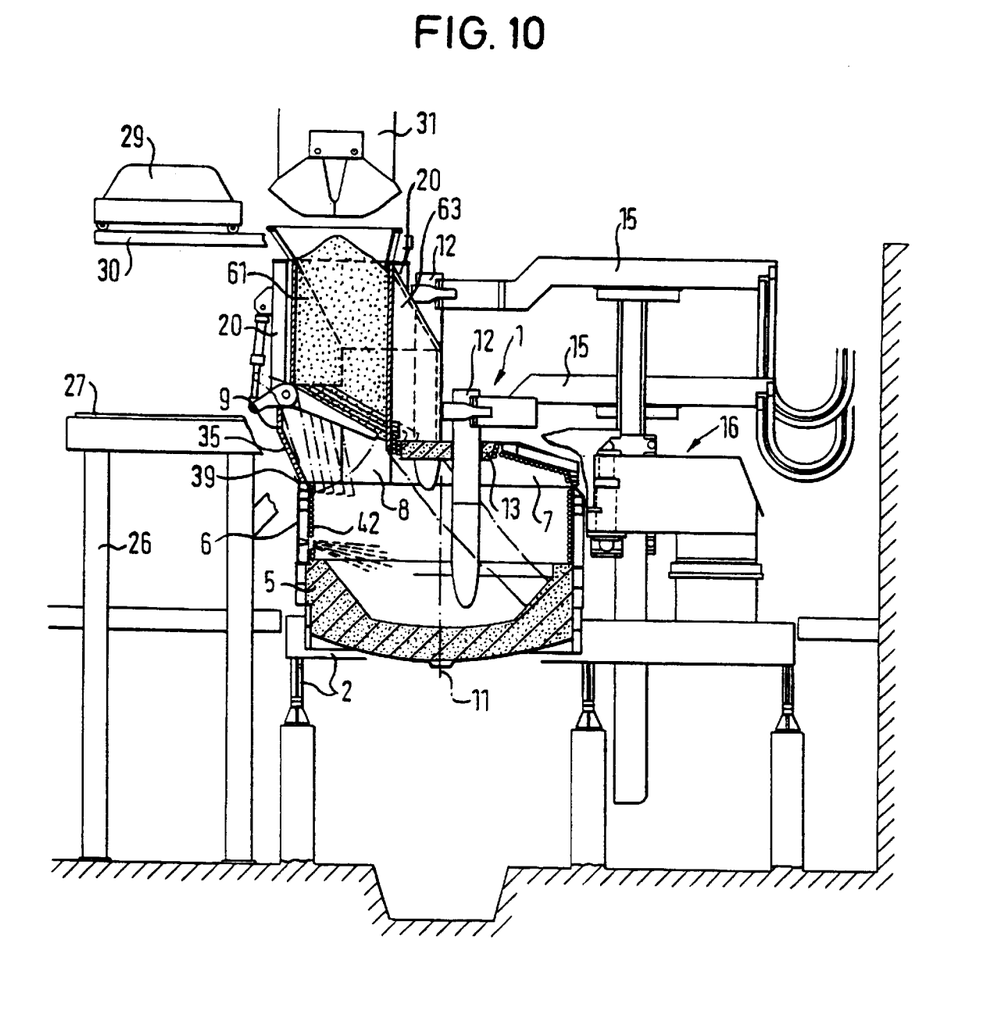
FIG. 10 is a view corresponding to FIG. 8 of a modification of the third embodiment, with a round upper vessel portion which does not have a converging wall sector.

FIG. 10 represents a modification of the third embodiment. In this case, upon conversion it is even possible to continue to use the existing round or oval upper vessel portion. In the embodiment shown in FIG. 10 the rear shaft wall 35 converges below the fingers 54 to the round cross-sectional profile of the upper edge of the upper vessel portion 6 of a round or oval furnace vessel. In other respects the embodiment of FIG. 10 corresponds to the third embodiment. Desirable configurations are an arch-like cover which prevents the internal cross-section of the shaft from being reduced in the lower region, and the pivotable fingers 54 which, upon being pivoted downwardly, guide the charging material towards the centre of the vessel and protect the upper edge of the vessel from downwardly dropping feed material.

What is claimed is:

1. A smelting unit having an arc furnace and characterized by a furnace vessel having a lower vessel portion and an upper vessel portion and a vessel cover having first and second cover portions of which the first cover portion includes at least one electrode opening, the second cover portion including a shaft fixed in a holding arrangement, with a closable charging opening and a gas passage opening in the upper region of the shaft for preheating feed material which is to be charged into the furnace vessel, in addition the holding arrangement and the vessel are displaceable horizontally relative to each other, and a part of the internal contour of the shaft cross-section, in a vertical projection, is outside the internal contour of the upper edge of the lower vessel portion and the upper vessel portion in the region beneath the shaft and/or the rear shaft wall as viewed from the electrode openings has a wall sector converging towards the vessel center.

2. A smelting unit according to claim 1 characterised in that the first and second cover portions are in the form of units which are separated from each other by a cover gap and which are displaceable horizontally relative to the vessel independently of each other.

3. A smelting unit according to claim 1 characterised in that the first cover portion can be raised/lowered and pivoted out to the side by a cover lifting and pivoting arrangement.

4. A smelting unit according to claim 3 characterised in that an electrode lifting and pivoting arrangement can be pivoted out jointly with the cover lifting and pivoting arrangement.

5. A smelting unit according to claim 1 characterised in that the second cover portion can be raised/lowered jointly with the shaft in the holding arrangement and the holding arrangement is horizontally displaceable.

6. A smelting unit according to claim 1 characterised in that the holding arrangement is displaceable perpendicularly to the cover gap.

7. A smelting unit according to claim 1 characterised in that means for sealing off the cover gap are provided at least at one of the two mutually adjoining edges of the first and second cover portions.

8. A smelting unit according to claim 7 characterised in that provided at one of the two mutually adjoining edges of the first and second cover portions is a groove which extends along the edge and provided at the other of said edges is a strip portion which extends along the edge and which engages with clearance into the groove when the cover is closed.

9. A smelting unit according to claim 7 characterised in that arranged at least at one of the mutually adjoining edges of the first and second cover portions is a duct which extends along the edge, with at least one nozzle opening which faces towards the cover gap and through which a sealing gas can be blown into the cover gap.

10. A smelting unit according to claim 9 characterised in that there is provided a slit-shaped nozzle opening which extends along the edge.

11. A smelting unit according to claim 9 characterised in that there is provided a row of holes extending along the edge as the nozzle opening.

12. A smelting unit according to claim 2 characterised in that the shaft wall which is the rear shaft wall as viewed from the electrode openings has a wall sector which converges towards the upper edge of the lower vessel portion.

13. A smelting unit according to claim 1 characterised in that the first cover portion is, in plan view, in the form of an oval delimited by a chord and the contour of the lower edge of the shaft wall which is the front shaft wall as viewed from the electrode openings is adapted to the contour of the chord.

14. A smelting unit according to claim 1 characterised in that the profile of the lower edge of the shaft wall which is the rear shaft wall as viewed from the electrode openings and the adjoining lateral side walls corresponds in the region of the second cover portion to the profile of the upper edge of the vessel.

15. A smelting unit according to claim 1 characterised in that the cross-sectional profile is rectangular in the upper portion of the shaft and the profile of the shaft wall which is the rear shaft wall as viewed from the electrode openings and the adjoining lateral shaft walls converges downwardly by way of an oval profile to the round profile of the upper edge of the lower vessel portion or the upper vessel portion.

16. A smelting unit according to claim 1 characterised in that the cross-sectional profile is rectangular in the upper portion of the shaft and the profile of the shaft wall which is the rear shaft wall as viewed from the electrode openings and the adjoining lateral shaft walls converges downwardly by way of a polygonal profile to the round profile of the upper edge of the lower vessel portion or the upper vessel portion.

17. A smelting unit according to claim 16 characterised in that the polygonal profile is a profile following a trapezoidal line.

18. A smelting unit according to claim 1 characterised in that the shaft wall which is the front shaft wall as viewed from the electrode openings converges extending in parallel relationship to the rear shaft wall.

19. A smelting unit according to claim 1 characterised in that in its lower region the shaft has retaining members for the feed material to be heated, which retaining members are movable from a closed position in which the passage therethrough for gas is possible but is blocked for charging material, into a release position in which the retaining members also release the passage of the feed material through the shaft.

20. A smelting unit according to claim 19 characterised in that the retaining members include fingers which are arranged parallel and at a spacing relative to each other and which are mounted in rotary mountings and which are pivotable downwardly from a closed position in which inner portions of the fingers project into the interior of the shaft to block the passage of charging material therethrough, into a release position in which said portions of the fingers point downwardly and release the charging material to pass through the shaft.

21. A smelting unit according to claim 20 characterised in that the rotary mountings for the pivotable fingers are arranged in the frame structure at the rear shaft wall and fixed fingers project into the interior of the shaft from the adjoining lateral shaft walls, the ends of which fixed fingers are disposed adjacent to the two outer pivotable fingers when the latter are in the closed position.

22. A smelting unit according to claim 21 characterised in that the inner portions of the pivotable fingers are inclined obliquely downwardly in the closed position and the inner ends of the fixed fingers which are towards said pivotable fingers are at approximately the same inclination as the two outer pivotable finger in the closed position.

23. A smelting unit according to claim 20 characterised in that by means of individual control of the pivotal movement of the outer fingers which are adjacent to the lateral shaft walls, those fingers are not pivotable downwardly as far as the central fingers which are disposed therebetween and which are jointly pivotable.

24. A smelting unit according to claim 20 characterised in that, in a shaft in which the rear shaft wall as viewed from the electrode openings and the lateral shaft walls adjoining same converge downwardly by way of a polygonal profile following a trapezoidal line and the horizontal beam member, adjoining the rear shaft wall, of the frame structure with the rotary mountings for the pivotable fingers extends parallel to the trapezoidal line contour of the rear shaft wall.

25. An arc furnace comprising a furnace vessel having a lower vessel portion forming a hearth and an upper vessel portion above the hearth, and a vessel cover having first and second cover portions, the first cover portion including at least one electrode opening, the second cover portion includes a shaft having a closable charging opening and a gas passage opening in the upper region of the shaft for preheating feed material which is to be charged into the furnace vessel, wherein the upper vessel portion in the region beneath the shaft and/or the rear shaft wall as viewed from the electrode openings has a wall sector converging towards the vessel center.

\* \* \* \* \*

UNITED STATES PATENT AND TRADEMARK OFFICE
CERTIFICATE OF CORRECTION

PATENT NO. : 6,274,081 B1
DATED : August 14, 2001
INVENTOR(S) : Gerhard Fuchs

It is certified that error appears in the above-identified patent and that said Letters Patent is hereby corrected as shown below:

<u>Title page,</u>
Item [86], change §102 (e) date from "August 22, 1997" to -- October 7, 1999 --.

Signed and Sealed this

Tenth Day of September, 2002

*Attest:*

JAMES E. ROGAN
*Attesting Officer  Director of the United States Patent and Trademark Office*